Dec. 6, 1966 E. LEMKE ETAL 3,290,532

CONJOINTLY-MOVABLE, PLURAL MAGNET MEANS FOR BLUE LATERAL CORRECTION IN COLOR KINESCOPES

Filed April 23, 1964 2 Sheets-Sheet 1

INVENTORS
EUGENE LEMKE &
PHILIP G. McCABE
BY W. H. Sprouagle
ATTORNEY

INVENTORS
EUGENE LEMKE &
PHILIP G. McCABE
BY W. H. Sprague
ATTORNEY 3,290,532
Patented Dec. 6, 1966

3,290,532

CONJOINTLY-MOVABLE, PLURAL MAGNET MEANS FOR BLUE LATERAL CORRECTION IN COLOR KINESCOPES

Eugene Lemke and Philip G. McCabe, Indianapolis, Ind., assignors to Radio Corporation of America, a corporation of Delaware Filed Apr. 23, 1964, Ser. No. 362,092
8 Claims. (Cl. 313—77)

Figure 1:
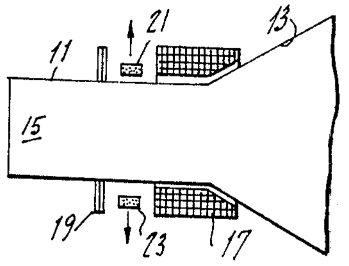

This invention relates generally to a magnetic beam control arrangement, and, particularly, to an arrangement for effecting beam control in a color image reproducing device.

A widely used form of color image reproducing device is the tri-gun, shadow-mask color kinescope. In operation of such a kinescope, it is intended that each of the beams produced by the three guns of the tube should selectively excite a particular set of phosphor dots luminescing in a particular primary color. To ensure that a particular beam selectively excites its assigned phosphor dots, the beam must approach the apertures of the shadow-mask that precedes the phosphor screen from the proper angle. It is also important that the plurality of beams converge at the target to effect light production at coincident target regions. For such convergence purposes, there is conventionally associated with the tri-gun color kinescope a set of beam convergence magnets for effecting adjustment of the respective beam positions prior to their deflection.

Such beam convergence structures are usually called upon for both static and dynamic adjustments. The so-called static adjustments are made to ensure the establishment of the proper beam convergence at the center of the phosphor screen; the dynamic adjustments then serve to ensure maintenance of the proper convergence for the bundle of beams throughout their deflection from the center in the course of the raster scanning process.

To achieve the center-of-the-screen static beam convergence, it has proved convenient to provide individual adjustment magnets for each beam, each magnet being subject to manual adjustment to vary the position of the associated beam in a radial direction with respect to the kinescope axis. The guns of the conventional tri-gun, shadow-mask color kinescope are disposed in a triangular configuration within the kinescope neck; the triangle is conventionally oriented in such manner that the blue phosphor exciting gun is positioned along a radius which extends from the axis vertically (in terms of the normal display position of the phosphor screen). With such a positioning of the blue gun, adjustment of the blue beam position along a radius from the tube axis corresponds to adjustment of the blue beam in a vertical direction.

In order to provide ability to correct for all possible misconvergence errors, it is necessary to supplement the three individual beam adjustments in respective radial directions with a fourth adjustment parameter. It can readily be shown that if individual beam adjustments along respective radii are supplemented by beam adjustment of just one of the three beams in a direction at right angles to the radial direction of adjustment for that beam, all patterns of misconvergence at the center of the screen are amenable to correction.

It is convenient, and has become customary, to associate the required fourth beam position adjustment parameter with the blue beam; i.e., to provide an adjustment of the blue beam position in a lateral or horizontal direction. In order for the four parameters of beam adjustment to be independent, the lateral adjustment of the blue beam generally should not affect the positioning of the remaining beams; this rule is subject, however, to one exception: movement of the other beams in the opposite lateral direction is readily tolerable and, indeed, desirable, since this accentuates the desired adjustment of the relative beam positions when controlling this fourth parameter.

To provide the noted blue lateral adjustment, a number of magnetic deflection schemes have been proposed and utilized. Common, however, to these prior art approaches has been the use of internal field shaping or directing structures; i.e., these approaches have relied upon magnetic straps or pole pieces within the kinescope itself to confine or direct the magnetic field developed by the external magnetic adjustor.

It has been found in work on color kinescopes having wide angle (e.g., 90° or more) deflection that the presence of internal magnetic structure for effecting the blue lateral adjustment is undesirable. A desired feature of such a wide-angle color kinescope is the ability to provide a relatively shortened neck for the kinescope. However, shortening of the neck requires closer spacing of the various magnetic beam adjusting devices that conventionally encircle the color kinescope neck. The problem of preventing undesired interaction between these closely adjacent devices is magnified by any significant shortening of the neck length. In this regard, the presence of internal pole pieces in conjunction with the blue lateral adjustor has been found to cause serious distortion of the color purity field when the color purity and blue lateral adjustors are closely spaced in adjacence on a short-neck kinescope.

The present invention is directed to a novel magnetic beam adjustment arrangement which permits achievement of the desired lateral deflection without need for internal magnetic structures. In accordance with an embodiment of the present invention, an arrangement of permanent magnets, of adjustable proximity to the kinescope axis, permits the necessary adjustment of the relative beam positions in a lateral direction without requiring magnetic material within the kinescope.

Accordingly, a primary object of the present invention is to provide new and improved magnetic beam control apparatus.

A further specific object of the present invention is to provide a magnetic beam control arrangement suitable for performing the so-called blue lateral deflection function in a color kinescope without reliance on internal magnetic structure.

Figure 2:
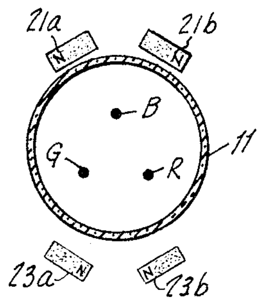
Figure 3:
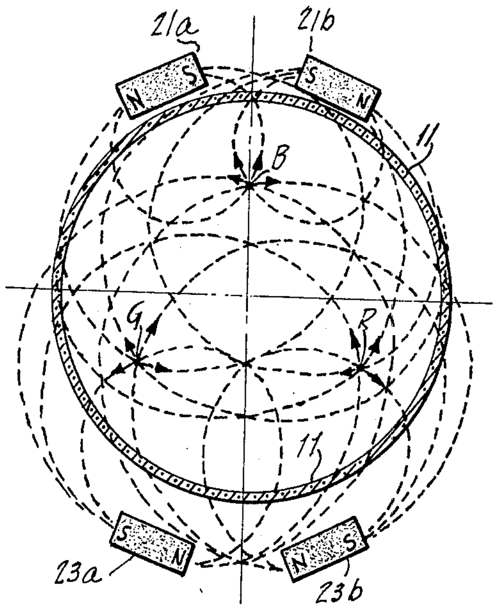
Figure 4:
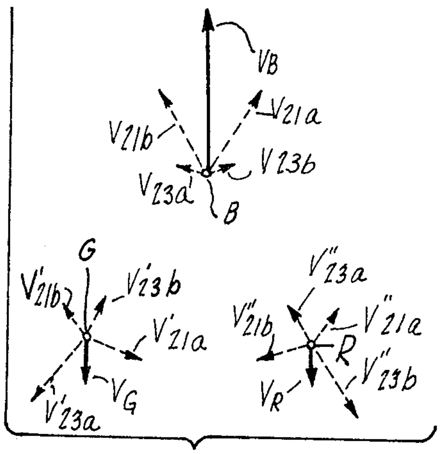
Figure 5:
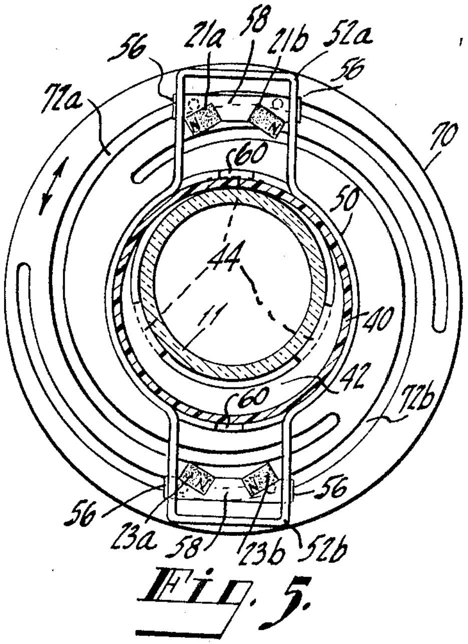
Figure 6:
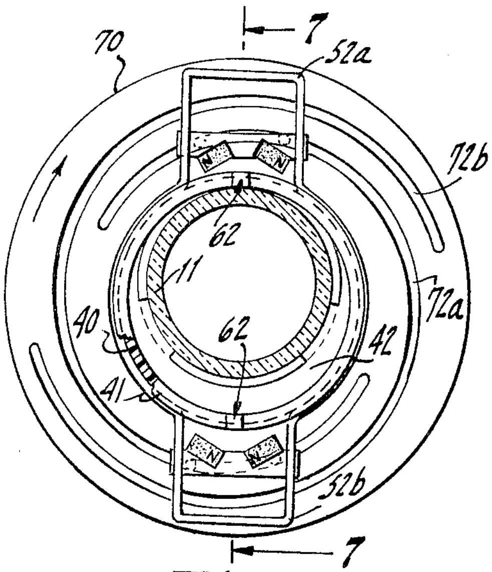
Figure 7:
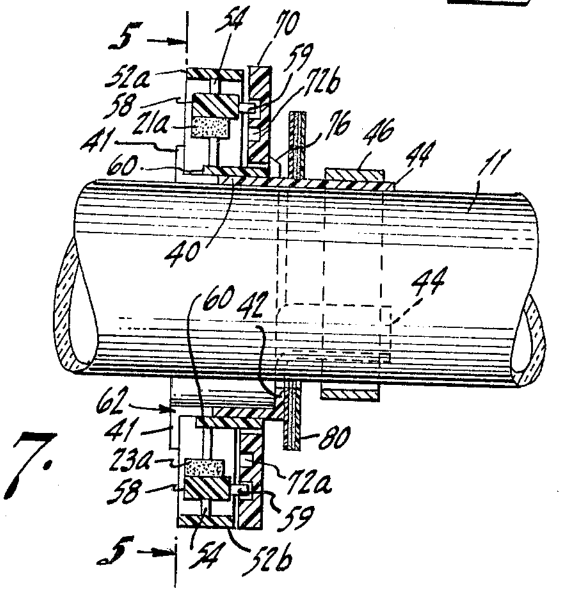

Other objects and advantages of the present invention will be readily recognized by those skilled in the art upon a reading of the following detailed description and an inspection of the accompanying drawings in which:

FIGURE 1 illustrates diagrammatically the association of lateral deflection controlling magnets with a color kinescope in accordance with the principles of the present invention;

FIGURE 2 provides, in a cross sectional view of the kinescope neck, a more complete showing of the magnet arrangement in accordance with an embodiment of the present invention;

FIGURE 3 supplements the cross sectional view of FIG. 2, on a larger scale, with a showing of flux lines associated with the respective magnets of the invention embodiment to aid in an explanation of the invention principles;

FIGURE 4 is a vector diagram, demonstrating the combined effects of the respective magnets of the invention embodiment upon the respective beams of the color kinescope;

FIGURES 5 and 6, in end view (partially in section), and FIGURE 7, in a cross-sectional side view, illustrate a mounting and adjusting structure that may be employed to support and adjust a magnet arrangement in accordance with an embodiment of the present invention.

The partial diagrammatic showing of FIGURE 1 is not intended to depict the exact configuration of a magnet arrangement in accordance with the present invention, but shows the general location and direction of movement of magnetic structures pursuant to the invention principles. The neck 11 and initial flared portion 13 of the envelope of a color kinescope 15 is illustrated in a partially broken away side view. A deflection yoke structure 17 encircles the forward end of the neck 11 and the adjacent segment of the flared envelope portion 13. The deflection yoke structure may, for example, be of the form wherein a common mount not only supports the raster-developing deflection yoke but also incorporates at its rear end beam convergence apparatus and support therefor. The details of the deflection and convergence apparatus, being of no concern in explaining the principles of the present inventio, have not been illustrated in FIGURE 1.

A color purity adjusting structure 19, performing a well-known function, also encircles the neck 11 of kinescope 15 at a point spaced to the rear of the deflection yoke structure 17. The color purity adjusting structure may, for example, take the form of a pair of magnetic rings, subject to individual rotational adjustment about the tube axis; but, again, since the details thereof are of no concern in describing the principles of the present invention, such details have not been illustrated in FIGURE 1.

A pair of diagrammatically illustrated magnetic structures 21 and 23, respectively, are shown in positions intermediate deflection yoke structure 17 and the purity adjusting structure 19. One magnetic structure 21 shown at the top of the drawing, has been illustrated as closely spaced to the envelope periphery of the top of neck 11; the other magnetic structure 23, shown at the bottom of the drawing, has been illustrated as more remotely spaced from the envelope periphery of neck 11 than the top magnetic structure 21. As the arrows on the drawing indicate, each of the magnetic structures 21 and 23 is subject to movement away from its illustrated position, the illustrated movements of direction being mutually opposite (though common in the sense of moving away from the tube axis).

A more complete showing of the intended magnetic structure, diagrammatically shown as structures 21 and 23, is provided in FIGURE 2, where a cross section of the tube neck is illustrated. As shown in FIGURE 2, the contemplated magnetic structure of the invention embodiment consists of four discrete magnets, arranged in pairs: magnets 21*a* and 21*b* being positioned near the top of the envelope, in proximity to the position of the blue beam of the kinescope (designated by the circle labelled B); and a pair of magnets 23*a* and 23*b* positioned at the bottom of the neck 11, in proximity to the green and red beam positions (designated G and R), respectively. The four magnets may conveniently be substantially identical in size, shape, material and magnetic strength.

Magnets 21*a* and 21*b* are symmetrically located on either side of the blue beam position. Each magnet is in the form of a bar, with each bar being tilted to extend generally perpendicular to a radius extending from tube axis to the bar center. The acute angle subtended by the respective radii is bisected by the vertical radius that extends through the center of the blue beam position.

The magnetic bars 23*a* and 23*b*, at the bottom of the drawing, are also tilted to be generally perpendicular to the respective radii from the tube axis to the respective magnetic bar centers. The bottom bar magnets 23*a* and 23*b* are in vertical registery with the top bar magnets 21*a* and 21*b*, respectively. However, the radial distance from the tube axis to each bar center for the bottom bar pair 23*a* and 23*b* is greater than the radial distance from the tube axis for the top bar pair 21*a* and 21*b*.

FIGURE 3 illustrates the flux line patterns associated with the respective magnets 21*a*, 21*b*, 23*a* and 23*b*. The arrows associated with the respective flux lines are in conformance with the convention designating flux flow from the north pole to the south pole. It will be observed that, in the illustrative showings of FIGURES 2 and 3, the poling of the top bar pair 21*a* and 21*b* is such that the respective south poles thereof adjoin, whereas the poling of the bottom bar pair 23*a* and 23*b* is such that the north poles thereof adjoin.

As FIGURE 3 shows, each of the beam positions B, R and G is intersected by lines of flux from each of the four magnets 21*a*, 21*b*, 23*a* and 23*b*. The flux line direction at each beam position is different for the flux lines of each magnet, and all differ from beam position to beam position. While no attempt has been made to accurately indicate it in FIGURE 3, the flux line strength for the field of each magnet at each beam position varies according to the distance from the beam position to the magnet location.

A more accurate representation of the relative differences in field strength and direction for each magnet's field at each beam position is presented by the vector diagrams of FIGURE 4. These vector diagrams further illustrate the combined effect on each beam of the interacting magnetic fields of the four magnets. As the upper vector diagram associated with the blue beam position B shows, the flux lines of the respective magnets 21*a* and 21*b* produce a net field that extends upwardly in a vertical direction as shown by the vector $V_B$. The contributions to this resultant provided by each of the magnets 21*a* and 21*b* are represented by the respective vectors $V_{21a}$ and $V_{21b}$. It should be observed that the bottom magnets 23*a* and 23*b* also contribute a small effect to the net field associated with the blue beam position B. The net effect from these two magnets remote from B and symmetrically disposed on either side thereof is a small component extending in the same direction as the resultant of vectors $V_{21a}$ and $V_{21b}$.

Neither of the beam positions G or R is symmetrically located with respect to either of the magnet pairs 21*a*, 21*b* or 23*a*, 23*b*. The magnet closest to the green beam position G is magnet 23*a* of the bottom pair. Its field ($V'_{23a}$) is diagonal to the horizontal and vertical directions. However, the combination of the respective fields of the other three magnets (represented by the vectors $V'_{21a}$, $V'_{21b}$ and $V'_{23b}$) is sufficient to overcome the lateral component of the field of magnet 23*a*, leaving a resultant field, represented by the vector $V_G$ which is parallel to the vertical axis, although opposite in polarity to the resultant field $V_B$ produced at the blue beam position.

An effect similar to that obtained at the green beam position is provided at the red beam position R. There, the closest magnet, producing the field of greatest strength, is magnet 23*b* of the bottom pair. Its field is also diagonally related to the horizontal and vertical axes (but is in a different quadrant than the field of magnet 23*a* at the green beam position). Again, the combined effects of the fields of the three remaining magnets is such as to effectively cancel out the lateral component of this diagonal field, leaving a resultant field, represented by the vector $V_R$, which is parallel to the vertical axis, and is of the same polarity as the resultant field at the green beam position, and equal in amplitude with the latter.

The effect of the resultant fields indicated in the vector diagram of FIGURE 4 is the desired one: a lateral movement of the blue beam position and smaller lateral movements of the green and red beam positions in an opposite direction.

As the respective magnet pairs 21*a*, 21*b* and 23*a*, 23*b* are moved outwardly away from the positions illustrated for them in FIGURE 3, the general result illustrated by the vector diagrams of FIGURE 4 continues to obtain although the resultant fields lessen in magnitude (i.e., the lateral shifts of the beams are of diminished amplitude). However, where the direction of movement of each of the magnets is not along respective radii, but, rather, in a common direction such as parallel to the vertical axis, the precise lateral field component cancellation effects illustrated for the green and red beam positions in FIGURE 4 exist at only one position along the path of travel; departures from this position result in incomplete cancellation of the lateral field component, and, hence, introduction of a small vertical component of green and red beam movement.

It has been found to be preferable to achieve the optimum lateral field component cancellation effect at the magnet structure adjustment position corresponding to maximum beam shift (i.e., the "close-in" position of the magnets illustrated in FIGURE 3). If this practice is followed, the lateral field component cancellation at the green and red beam positions will become less complete as the magnets travel further away from the tube. This has been found to be quite tolerable since the magnitude of the resultant field at the green and red beam positions rapidly diminishes to a relatively insignificant value as the magnets are moved away from the tube, and the particular direction of beam movement produced accordingly becomes less and less significant.

With the illustrated top location of the magnet pair 21*a*, 21*b* and bottom location of the magnet pair 23*a*, 23*b*, the lateral movement of the blue beam effected by the magnetic structure will only be in one particular direction (with the magnitude of movement in that direction determined by the adjustment of proximity of the magnet pairs to the tube axis). To obtain movement of the blue beam in the opposite direction, the locations of the respective magnet pairs should be exchanged (i.e., magnet pair 23*a*, 23*b* in the top position, in proximity to the blue location, and magnet pair 21*a*, 21*b* in the bottom position). The exchange should be effected in such manner as to maintain the now bottom magnet pair more remote from the tube axis than the now top magnet pair, so that the previously described lateral field component cancellation effect can be retained. Adjustment of the magnitude of the opposite direction movement of the blue beam is achieved in the same manner as previously described, i.e., by conjoint inward or outward movement of both magnet pairs with respect to the tube axis.

FIGURES 5, 6 and 7 illustrate several views of a form of mounting and adjusting structure for the magnet pairs 21*a*, 21*b* and 23*a*, 23*b*, which structure has been found to be quite satisfactory for achieving the desired blue lateral adjustment in accordance with the principles of the invention discussed above. The illustrated mounting and adjusting structure is the subject of a copending application of John M. Ammerman, Serial No. 361,951 filed concurrently herewith.

FIGURE 5 is an end view of the lateral magnet holder structure (partially in section) in position encircling the kinescope neck (shown in cross-sectional view), with the magnets midway in their range of positional adjustment. FIGURE 6 is a similar view, with the magnets altered from their midway position of FIGURE 5 to a position approaching the "close-in" end of the adjustment range. FIGURE 7 is a side view of the kinescope neck, with the lateral magnet holder structure shown in cross-section.

The holder structure of FIGURES 5, 6 and 7 includes a main cylindrical support member 40 which is adapted to encircle the kinescope neck 11 to provide an outer cylindrical surface eccentrically related to the cylindrical neck. A generally crescent-shaped web or diaphragm member 42 extending within the cylindrical body of member 40 abuts a major portion of the outer surface of the kinescope neck, establishing the eccentricity of the outer cylindrical surface. Proper orientation of this web member 42 with respect to the circumference of the tube neck shifts the axis of the cylindrical surface of member 40 in a downward vertical direction relative to the tube neck axis. The support member 40 is provided at one end with a raised cylindrical flange 41, and at the opposite end with a trio of fingerlike extensions 44 which extend longitudinally with respect to the tube axis from one end of the main cylindrical body of the support. These fingers abut the outer surface of the kinescope neck, and receive a clamping strap 46, which encircles the tube neck in abutment with the outer surface of the fingers 44. The strap 46 is provided with suitable means (not illustrated) for tightly securing the strap to lock the support member 40 in position on the tube neck.

Surrounding the main cylindrical portion of support member 40 is a generally cylindrical guide member 50. Integral with the main cylindrical portion of the guide member 50 are two raised cage members 52*a*, 52*b* attached to the periphery of the cylindrical portion in positions 180° apart. Each of the cage members 52*a* and 52*b* have respective slots 54 extending longitudinally in the center of each cage side member, the slots thus extending at right angles to the longitudinal axis of the tube neck 11. The two slots of each cage member are in registry with each other, and are adapted to receive respective end flanges 56 of a magnet holder 58.

Each magnet holder 58 incorporates a pair of oppositely, inwardly canted magnet receiving grooves, within which are secured (e.g., with glue) individual permanent magnets. The grooves of the magnet holder 58 associated with the cage 52*a* are shown as receiving the individual bar magnets 21*a* and 21*b*, whereas the grooves of the holder 58 associated with cage 52*b* are shown as receiving the individual bar magnets 23*a* and 23*b*. The individual magnets are polarized as in the showing of FIGURE 2; thus, the poling of the top pair of bar magnets 21*a* and 21*b* is such that the respective south poles thereof adjoin, whereas the poling of the bottom bar pair 23*a* and 23*b* is such that the north poles thereof adjoin.

The portions of the cylindrical body of guide member 50 bridged by the respective cage members 52*a* and 52*b* are cut away, with the exception of lug projections 60, which constitute finger-like continuations of the main cylindrical body of the guide 50 in line with the center of each overlying cage. The main cylindrical body of the support member 40 is provided with a pair of slots 62 at its flanged end. The lugs 60 are intended for releasable detention in the slots 62, whereby the guide 50 is alterable between two rotational positions about the support member 40. In one position, the cage 52*a*, retaining the holder for the south pole-adjoining pair of magnets, is positioned at the top of the structure (i.e., in that position permitting close approach of the magnets to the kinescope envelope) while the cage 52*b* is positioned at the bottom of the structure, more remote from the tube envelope due to the interposition of web member 42. In the second position, the respective cages are reversed, with the cage 52*b*, retaining the holder of the north pole-adjoining magnets, being located at the top of the structure, permitting close approach of this magnet pair to the tube envelope.

Surrounding the periphery of the cylindrical body portion of guide 50, to the rear of the cage locations (as viewed in FIGURES 5 and 6), is a rotable, disc-like cam member 70. The surface of the cam member 70 adjacent to the cage location is provided with a pair of interleaved spiral grooves 72*a* and 72*b*. Each of the magnet holders 58 is provided with a pair of rearwardly projecting pins 59. The pins of the holder retained by cage 52*a* ride in the spiral groove 72*a*, while the pins of the holder retained by the cage 52*b* ride in the groove 72*b*.

As the cam member 70 is rotated about the bearing surface provided by the cylindrical body of guide 50, the spiral grooves of the cam serve to impart vertical motion to the respective holders 58. The respective grooves **72*a* and 72*b* are interleaved in such manner as to cause upward motion of the holder in cage 52*b* when the holder in cage 52*a* receives downward motion, and vice versa. As the grooves of the member 70 cam the respective holders upwardly or downwardly, the engagement of flanges 56 with slots 54 provide guiding action restricting the holder to motion in a vertical direction, and retaining the holder pins in the respective grooves of cam 70**.

The adjustment motion desired for the four magnets **21*a*, 21*b*, 23*a* and 23*b*, as discussed in conjunction with FIGURE 2, is thus readily provided by the support and adjustment structure of FIGURES 5, 6 and 7. While not illustrated in complete detail, it may be noted that the guide member 50 is conveniently provided with several turned up detect projections 76 about the periphery of its rearmost edge to act as stops for the rear surface of the cam member 70. Likewise, the main cylindrical body portion of support member 40 is provided with radially outwardly projecting detents (not shown) at the rear edge thereof to serve as stops for the rear edge of the cylindrical body of guide 50. Additionally, the fingerlike projections 44 at the rear of support member 40 are made sufficiently long so as to provide sufficient space along the tube axis between the strap 46 location and the rear wall of the web member 42 to accommodate the purity correcting ring structure 80. The purity rings rotate about a bearing surface provided by the fingers 44; the strap member 46 and the rear wall of web member 42 also serve to fix the location of the purity ring structure 80 longitudinally with respect to the tube neck 11**.

What is claimed is:

1. In combination with an image reproducing tube having a generally cylindrical, beam-enclosing neck portion, beam position adjusting apparatus comprising:

a first pair of magnets, the magnets of said first pair being disposed at first selected positions spaced about the external periphery of said cylindrical tube neck portion;

a second pair of magnets, the magnets of said second pair being disposed at second selected positions spaced about the external periphery of said neck portion, the peripheral neck region adjacent to said second magnet positions being diametrically opposed to the peripheral neck region adjacent to said first magnet positions;

and adjustable support means for conjointly altering the proximity of said first and second magnet pairs to the central axis of said cylindrical neck portion.

2. In combination with an image reproducing tube having a generally cylindrical, beam-enclosing neck portion, beam position adjusting apparatus comprising:

a first pair of magnets, the magnets of said first pair being disposed at first selected positions spaced about the external periphery of said cylindrical tube neck portion;

a second pair of magnets, the magnets of said second pair being disposed at second selected positions spaced about the external periphery of said neck portion, the peripheral neck region adjacent to said second magnet positions being diametrically opposed to the peripheral neck region adjacent to said first magnet positions;

and adjustable support means for conjointly altering, in the same sense and by substantially the same amount, the proximity of said first and second magnet pairs to the central axis of said cylindrical neck portion.

3. In combination with a color image reproducing tube having a generally cylindrical, beam-enclosing neck portion, beam position adjusting apparatus comprising:

a first pair of magnets, the magnets of said first pair being disposed at first selected positions spaced about the external periphery of said cylindrical tube neck portions;

a second pair of magnets, the magnets of said second pair being disposed at second selected positions spaced about the external periphery of said neck portion, the peripheral neck region adjacent to said second magnet positions being diametrically opposed to the peripheral neck region adjacent to said first magnet positions;

and an adjustable support for said magnet pairs comprising means for conjointly altering, in the same sense, the proximity of said first and second magnet pairs to the central axis of said cylindrical neck portion while maintaining a given difference in the respective proximities thereto.

4. In combination with a color image reproducing tube having a generally cylindrical, beam-enclosing neck portion, beam position adjusting apparatus comprising:

a first pair of magnets, said first magnet pair occupying a selectable one of a first and a second set of peripherally spaced magnet locations disposed about the external periphery of said cylindrical tube neck portion;

a second pair of magnets, said second magnet pair occupying the other of said first and second sets of magnet locations, the peripheral neck region adjacent to said other set of magnet locations being diametrically opposed to the peripheral neck region adjacent to said one set of magnet locations;

and an adjustable support for said magnet pairs comprising means for conjointly altering, in the same sense, the proximity of said first and second magnet pairs to the central axis of said cylindrical neck portion while maintaining a given difference in the respective proximities thereto.

5. In combination with a color image reproducing tube having a generally cylindrical, beam-enclosing neck portion, beam position adjusting apparatus comprising:

a first pair of magnets, said first magnet pair occupying a selectable one of a first and a second set of peripherally spaced magnet locations positioned about the external periphery of said cylindrical tube neck portion, the magnets of said first pair being disposed in the selected locations with mutually adjacent north poles;

a second pair of magnets, said second magnet pair occupying the remaining one of said first and second sets of magnet locations, the peripheral neck region adjacent to said remaining set of magnet locations being diametrically opposed to the peripheral neck region adjacent to said one set of magnet locations, and the magnets of said second pair being disposed in said remaining locations with mutually adjacent south poles;

and an adjustable support for said magnet pairs comprising means for establishing a difference between the proximity to the central axis of said cylindrical neck portion of the magnet pair occuping said one set of locations and the proximity to said axis of the magnet pair occuping said remaining set of locations, and means for conjointly altering, in the same sense, the proximity of both of said magnet pairs to said axis while maintaining said proximity difference.

6. In combination with a color image reproducing tube having a generally cylindrical neck portion enclosing the paths of a trio of electron beams; beam position adjusting apparatus comprising:

a first pair of magnets, said first magnet pair occupying a selectable one of a first and a second set of peripherally spaced magnet locations positioned about the external periphery of said cylindrical tube neck portion, the magnets of said first pair being disposed in the selected locations with corresponding poles of a first polarity lying adjacent to each other;

a second pair of magnets, said second magnet pair occupying the remaining one of said first and second sets of magnet locations in such a manner that the magnets of said second pair have corresponding poles of a second polarity opposite to said first polarity lying adjacent to each other, the peripheral neck region adjacent to said remaining set of magnet locations being diametrically opposed to the peripheral neck region adjacent to said one set of magnet locations, one of said peripheral neck regions being relatively close to the enclosed path of a given one of said trio of beams and relatively remote from the enclosed paths of both of the remaining ones of said trio of beams;

support means for establishing a difference between the proximity to the central axis of said cylindrical neck portion of the magnet pair occupying said one set of locations and the proximity to said axis of the magnet pair occupying said remaining set of locations, the proximity difference being such that the magnet pair occupying the set of locations adjacent to said one peripheral neck region is closest to said central axis;

and adjusting means cooperating with said support means for conjointly altering, in the same sense, the proximity of both of said magnet pairs to said axis while maintaining said proximity difference.

7. In combination with a color image reproducing tube having a generally cylindrical neck portion enclosing the paths of a trio of electron beams, said beam paths being generally parallel to the central axis of said cylindrical neck portion but substantially equally spaced therefrom in respective radial directions, with a given one of said beam paths being spaced from said axis in a radical direction that is vertically disposed; apparatus for adjusting the relative positions of said beam paths in a lateral direction, comprising the combination of:

a first pair of magnets, said first magnet pair occupying a selectable one of a first and a second set of peripherally spaced magnet locations positioned about the external periphery of said cylindrical tube neck portion, the magnets of said first pair being disposed in the selected locations with corresponding poles of a first polarity lying adjacent to each other;

a second pair of magnets, said second magnet pair occupying the remaining one of said first and second sets of magnet locations in such a manner that the magnets of said second pair have corresponding poles of a second polarity opposite to said first polarity lying adjacent to each other, the peripheral neck region adjacent to said remaining set of magnet locations being diametrically opposed to the peripheral neck region adjacent to said one set of magnet locations, one of said peripheral neck regions being relatively close to said given one of said beam paths and relatively remote from the remaining ones of beam paths;

support means for establishing a difference between the proximity to said central axis of the magnet pair occupying said one set of locations and the proximity to said axis of the magnet pair occupying said remaining set of locations, the proximity difference being such that the magnet pair occupying the set of locations adjacent to said one peripheral neck region is closest to said central axis;

and adjusting means cooperating with said support means for conjointly altering, in the same sense, the proximity of both of said magnet pairs to said axis while maintaining said proximity difference.

8. A kinescope adjunct for mounting on a cylindrical kinescope neck comprising:

a support having a cylindrical opening adapted to receive a kinescope neck;

a first pair of magnets held in fixed position relative to each other such that corresponding poles thereof of a first polarity lie mutually adjacent;

a second pair of magnets held in fixed position relative to each other such that corresponding poles thereof of a second polarity, opposite to said first polarity, lie mutually adjacent;

and means for adjustably mounting said magnet pairs on said support such that said magnet pairs are disposed in the vicinity of diametrically opposed edges of said opening, a selectable one of said magnet pairs being adjustable between a first position closely adjacent a given edge of said opening and a second position more remote from said given edge, with adjustment of the selected one of said magnet pairs between said first and second positions being accompanied by concomitant alteration, in the same sense, of the proximity of the remaining magnet pair to the edge of said opening diametrically opposed to said given edge, but with the distance between said remaining magnet pair and said opposed edge exceeding the distance betwen said selected magnet pair and said given edge throughout the range of position adjustment.

No references cited.

JAMES W. LAWRENCE, *Primary Examiner.*

V. LA FRANCHI, *Assistant Examiner.*